UNITED STATES PATENT OFFICE.

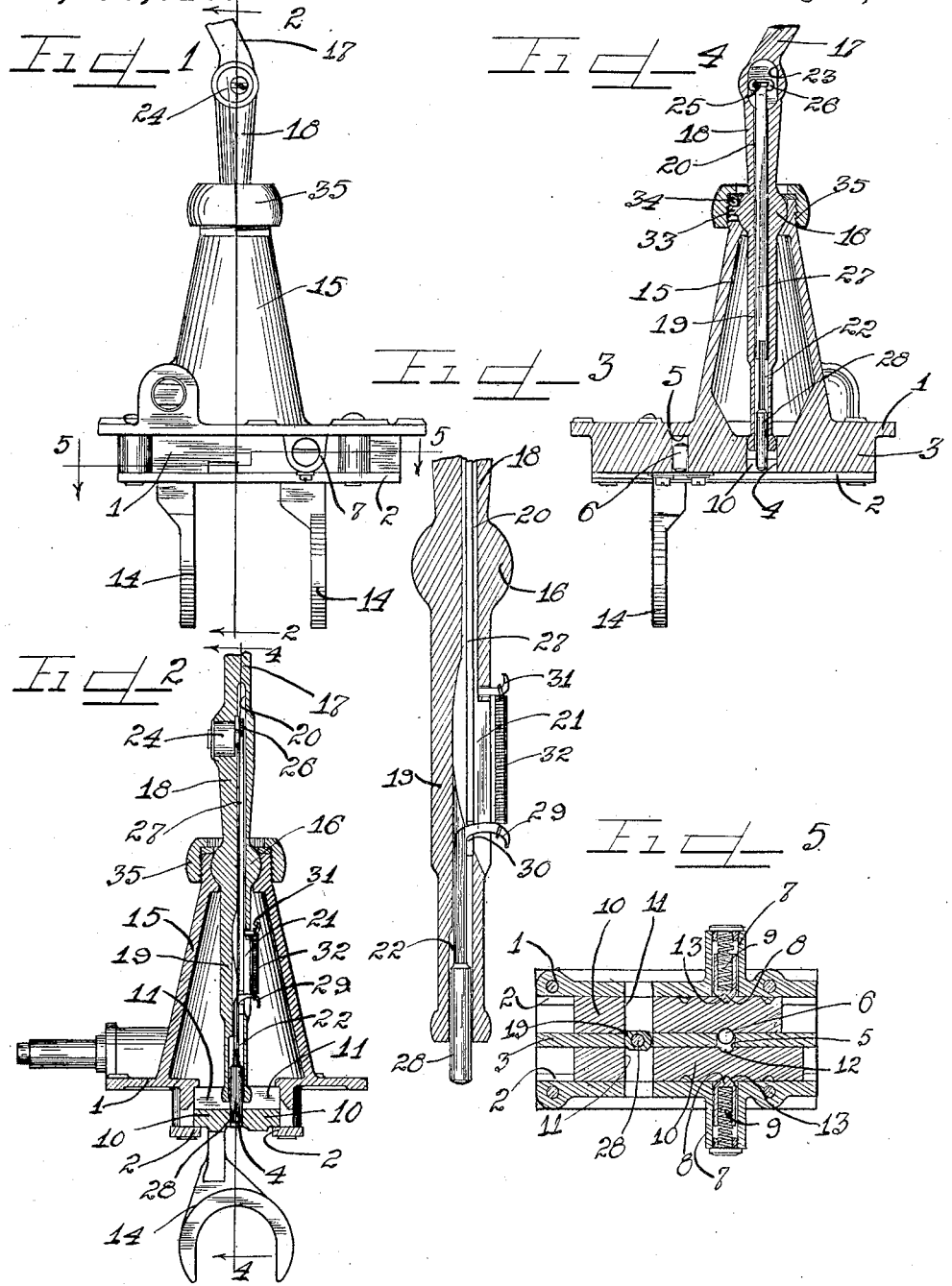

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

GEAR-SHIFT-LEVER LOCK.

1,350,810.

Specification of Letters Patent.  Patented Aug. 24, 1920.

Application filed September 18, 1917. Serial No. 191,960.

*To all whom it may concern:*

Be it known that I, COLVIN L. JOHNSON, a citizen of the United States, and a resident of the city of Chicago, in the county of Cook and State of Illinois, have invented certain new and useful Improvements in Gear-Shift-Lever Locks; and I do hereby declare that the following is a full, clear, and exact description of the same, reference being had to the accompanying drawings, and the numerals of reference marked thereon, which form a part of this specification.

This invention relates to an improved form of a gear shift lever lock for automobiles, in which the locking mechanisms are disposed within the gear shift lever, the locking bolt of the mechanisms being controlled by a spring mounted upon the exterior of the lower inclosed end of said gear shift lever to afford a means for returning the locking bolt to normal position upon release of a key lock. The locking bolt is adapted to be projected axially through the lower end of the gear shift lever, and engage between gear shift blocks mounted in a stationary support to hold the gear shift lever locked against movement.

It is an object of this invention to provide a gear shift lever lock for vehicles wherein a locking bolt is adapted to be projected from the gear shift lever to engage in an aperture provided in the stationary support of the gear shift blocks.

It is also an object of this invention to construct a gear shift lever lock wherein a spring controlled locking member slidably disposed within the lower inclosed end of the gear shift lever is adapted to be projected therefrom to lock said lever against movement.

It is a further object of this invention to provide a locking mechanism for a gear shift lever adapted to be actuated to engage between gear shift blocks to hold said gear shift lever in locked position.

It is furthermore an object of this invention to construct a lock for a gear shift lever embracing spring controlled locking members slidably engaged longitudinally within the lower end of said lever adapted to be actuated to engage in an aperture in the stationary gear shift block support and between the blocks thereof to lock said lever against movement.

It is an important object of this invention to construct a gear shift lever lock of simple and effective construction adapted to readily lock or unlock the lever in neutral position only by means of a key for the purpose.

Other and further important objects of the invention will be apparent from the disclosures in the specification and drawings.

The invention (in a preferred form) is illustrated in the drawings and hereinafter more fully described.

On the drawings:

Figure 1 is an elevational view partly broken away, showing a gear shift lever and its mounting, said lever being equipped with a lock embodying the principles of this invention.

Fig. 2 is a section taken on line 2—2 of Fig. 1, with parts shown in elevation.

Fig. 3 is an enlarged central longitudinal section taken through the lower end of the gear shift lever.

Fig. 4 is a section taken on line 4—4 of Fig 2, with parts shown in elevation.

Fig. 5 is a section taken on line 5—5 of Fig. 1.

As shown on the drawings:

The reference numeral 1, indicates a support or housing adapted to be rigidly secured upon the top of a transmission gear shift case (not shown). The bottom of the support 1, is open, and integrally formed on the lower edge of the inner surface of each of the side walls thereof is a flange or guide rail 2. The interior of said support is divided into two longitudinal compartments by means of a longitudinal partition wall 3, integrally formed centrally within the support. The wall 3, is provided with a vertical passage or aperture 4, and a small opening 5, within which is movably disposed a shift pin 6. Integrally formed on the outer surface of each of the side walls of the support 1, opposite one another, is a cylindrical sleeve or collar 7, in each of which is slidably mounted a locking pin 8, within which is seated a spring 9, adapted to normally hold said pins projected through suitable openings in the side walls of the support into the longitudinal compartments, as shown in Fig. 5. Slidably mounted upon the guide rail 2, in each of the support compartments is a gear shift block 10, each provided with a transverse slot or opening 11, in the upper portion thereof, normally disposed opposite one another and in alinement with the passage 4, of the partition wall. Also formed in the inner face or the face adjacent the partition wall of each of the blocks 10, is a curved or rounded notch 12, normally disposed to register with the opening 5, of said partition wall. The outer surface of each of the blocks 10, has a notch 13, formed therein normally disposed to receive the inner projecting end of one of the locking pins 8, seated therein. Integrally formed and projecting downwardly below each of the blocks 10, is a forked gear shift member 14, adapted to project into the gear shift case of the vehicle to shift the gears when said blocks 10, are actuated.

Integrally formed or rigidly secured upon the top of the support 1, is a hollow lever support casing 15, the upper reduced portion of which is provided with a socket adapted to removably receive seated therein the ball portion 16, of a gear shift lever 17, which projects upwardly through the open top of said casing 15, and has the upper portion bent at an angle with respect to an enlarged portion 18, integrally connecting the ball 16, with the lever proper. Integrally formed on the bottom of the ball 16, and projecting downwardly therefrom is a tail piece 19, axially alined with the enlarged lever portion 18, and normally adapted to be disposed in a vertical position with the lower end thereof engaged in the passage 4, of the partition wall 3. The lever portion 18, the ball 16, and the upper part of the tail piece 19, are provided with a passage 20, the lower end of which communicates with an enlarged slot 21, formed in one side of the tail piece 19. Axially formed in the lower end of the tail piece 19, is a passage 22, the upper end of which communicates with the slot 21, while the lower end passes centrally through the end of the tail piece.

As clearly shown in Fig. 4, the upper end of the lever portion 18, is provided with a chamber 23, which communicates with the upper end of the passage 20, and has mounted therein a pin type of lock 24, the inner end of the barrel of which is provided with a pin or projection 25, engaged in a slotted head 26, formed on the upper end of a latch bar 27, slidably disposed within the passage 20, and the slot 21, and adapted to have the lower end thereof engage in the upper end of the passage 22, when the device is locked, as shown in Fig. 3. Slidably disposed within the passage 22, is a locking bolt 28, the upper end of which is of reduced diameter and has integrally formed thereon a hook 29, which engages through an aperture 30, in the lower end of the latch bar 27, and has the end thereof extending outwardly through said slot 21. Rigidly secured upon the exterior of the tail piece 19, directly above the slot 21, is a hooked extension or projection 31, upon which is engaged the upper end of a coil spring 32, the lower end of which is attached to the hook 29, of the locking bolt, to normally hold said bolt in retracted or unlocked position within the tail piece.

The operation is as follows:

When the gear shift lever 17, is in neutral position, the lower end of the tail piece 19, projects into the aperture 4, of the partition wall 3, as shown in Fig. 5. In order to shift the gears, a composite movement of the gear shift lever 17, is necessary, that is, the lever must be thrown to one side and then either forwardly or rearwardly for the purpose, the tail piece 19, engaging in the slot 11, of one of the gear shift blocks 10, contacting one of the walls of said slot, thereby forcing the respective block 10, either forward or rearward in the support 1, and thereby permitting the forked member 14, to shift the gears. To prevent rotation of the gear shift lever 17, within the casing 15, a projection 33, is integrally formed on the ball 16, and projects into a vertical slot 34, formed in the upper end of the casing 15. Said casing has the upper end thereof externally threaded to removably receive a retaining ring 35, threaded thereon to hold the lever in position for operation.

In the unlocked position of the lever 17, the projection 25, of the barrel of the lock 24, is in its uppermost position and seated in one end of the slot in the latch bar head 26, thus holding the latch bar 27, elevated with the locking bolt 28, attached thereto in retracted or release position, the action of the spring 32, acting automatically to assist in the retraction of the locking bolt. To lock the lever from movement, it is first moved into neutral position, and by means of a key inserted in the pin type of lock 24, the barrel thereof is rotated, with the projection 25, sliding to the other end of the slotted head 26, of the latch bar, thus forcing the latch bar 27, downwardly and thereby simultaneously moving the locking bolt 28, out through the bottom of the tail piece 19, and into the aperture 4, between the shift blocks 10, as shown in Fig. 2, thereby locking the lever and preventing theft of an automobile, or interference with the gear shift mechanisms thereof. With the downward movement of the locking bolt into locking position, the controlling spring 32, attached thereto is tensioned but is prevented from drawing the locking bolt upwardly by the mechanisms of the lock 24.

To unlock the device, it is only necessary to insert the key in the lock 24, and by turning the barrel in an opposite direction, the latch bar 27, is released and the force of the tensioned spring 32, acts automatically to retract the locking bolt 28, into its uppermost or release position out of engagement with the gear shift blocks 10.

By referring to Fig. 5, it will be noted that the lever is shown in neutral position, engaged in the aperture 4, of the partition wall 3. When the locking bolt 28, is retracted, the lever 17, may be moved out of the aperture 4, into the opening 11, of either one of the gear shift blocks 10. The movement of the lever forwardly or rearwardly will tend to shift the respective block 10, forcing the locking pin 8, into the sleeve 7, against the action of the spring 9, and at the same time moves the shifting pin 6, into engagement with the notch 12, of the other block 10, to hold the same locked against movement, thereby permitting the shifting of only one of the blocks 10, at a time.

I am aware that various details of construction may be varied through a wide range without departing from the principles of this invention, and I therefore do not purpose limiting the patent granted otherwise than necessitated by the prior art.

I claim as my invention:

1. In a device of the class described, the combination with a gear shift lever, of an apertured gear shift block support, gear shift blocks movably mounted therein on each side of said aperture, key-operated means within the gear shift lever adapted to be moved downwardly through the lower end of said lever into said aperture and between said gear shift blocks to hold said lever locked from movement, a hook on said lever and on said key operated means, and resilient means attached to said hooks for returning said key operated means to normal position.

2. In a gear shift lever lock the combination with a gear shift lever having a passage therein, a projection on said lever, key-operated means within said passage, a hooked locking member also in said passage connected with said key-operated means and adapted to be projected through the open lower end of said lever when said key-operated means is actuated, an apertured stationary gear shift block support below said lever to receive said locking member to hold said lever locked against movement, and means connected to said hooked locking member and to said projection for returning said hooked locking member to release position.

3. In a gear shift lever lock the combination with a passaged gear shift block support, of a gear shift lever having a longitudinal passage and slot therein, a key-operated lock on said lever, a latch bar within said passage connected with said lock, a locking bolt in said passage, a hooked member thereon engaging the lower end of said latch bar and projecting outwardly through said slot, said locking bolt adapted to be moved to engage in said passaged block support to hold said lever locked when said latch bar and key lock are operated, a projection on said lever, and resilient means attached thereto and to said hooked member for returning the locking bolt to normal position when said key lock is released.

4. In a device of the class described the combination with a gear shift lever having a slot and passages therein, a key lock mounted in said lever, a latch bar in one of said passages connected therewith, a hooked locking bolt in the other of said passages connected with said latch bar, and having the hooked portion thereof projecting through said slot, said locking bolt adapted to be projected into locking position by said latch bar when said key lock is operated, and a spring connected with said lever and said hooked locking bolt for returning said hooked locking bolt to a release position when said key lock is released.

In testimony whereof I have hereunto subscribed my name in the presence of two subscribing witnesses.

COLVIN L. JOHNSON.

Witnesses:
 CHARLES W. HILLS, Jr.,
 EARL M. HARDINE.